United States Patent
Shao et al.

(10) Patent No.: US 12,464,711 B2
(45) Date of Patent: Nov. 4, 2025

(54) THREE-DIMENSIONAL MEMORY AND METHOD FOR FORMING SAME

(71) Applicant: CHANGXIN MEMORY TECHNOLOGIES, INC., Hefei (CN)

(72) Inventors: Guangsu Shao, Hefei (CN); Deyuan Xiao, Hefei (CN)

(73) Assignee: CHANGXIN MEMORY TECHNOLOGIES, INC, Hefei (CN)

( * ) Notice: Subject to any disclaimer, the term of this patent is extended or adjusted under 35 U.S.C. 154(b) by 617 days.

(21) Appl. No.: 17/882,696

(22) Filed: Aug. 8, 2022

(65) Prior Publication Data

US 2023/0345710 A1    Oct. 26, 2023

Related U.S. Application Data

(63) Continuation of application No. PCT/CN2022/096757, filed on Jun. 2, 2022.

(30) Foreign Application Priority Data

Apr. 26, 2022    (CN) ..................... 202210445304.3

(51) Int. Cl.
H10B 12/00    (2023.01)

(52) U.S. Cl.
CPC .......... *H10B 12/488* (2023.02); *H10B 12/30* (2023.02)

(58) Field of Classification Search
None
See application file for complete search history.

(56) References Cited

U.S. PATENT DOCUMENTS

| 2017/0179028 A1* | 6/2017 | Lee ................. H10B 41/20 |
| 2021/0375926 A1 | 12/2021 | Mehandru et al. |
| 2022/0278128 A1* | 9/2022 | Young ............... H10B 43/30 |

* cited by examiner

*Primary Examiner* — Sue A Purvis
*Assistant Examiner* — Jordan M Klein
(74) *Attorney, Agent, or Firm* — Syncoda LLC; Feng Ma

(57) ABSTRACT

A three-dimensional memory and a method for forming the same are provided. The three-dimensional memory includes a substrate, a plurality of word lines and a plurality of lead lines. The word lines are located on the substrate. Each of the word lines extends in a first direction, and includes a first end and a second end opposite to the first end along the first direction. The lead lines are located on the substrate and are connected to the word lines in one-to-one correspondence. There are at least two adjacent word lines, in which the lead line connected to one of the at least two adjacent word lines is located at the first end, and the lead line connected to the other one of the at least two adjacent word lines is located at the second end.

18 Claims, 9 Drawing Sheets

A substrate is formed, and a plurality of word lines are formed on the substrate, in which each of the word lines extends in a first direction a-a', and each of the word lines includes a first end P1 and a second end P2 opposite to the first end P1 along the first direction a-a', the plurality of word lines are spaced apart away from each other in a direction perpendicular to the top surface of the substrate, and the first direction a-a' is a direction parallel to the top surface of the substrate ~ S51

A plurality of lead lines are formed on the substrate, in which each of the lead lines extends in the direction perpendicular to the top surface of the substrate, the plurality of lead lines are connected to the plurality of word lines in one-to-one correspondence, and there are at least two adjacent ones of the word lines in the direction perpendicular to the top surface of the substrate, in which the lead line connected to one of the at least two adjacent word lines is located at the first end P1 of the one of the at least two adjacent word lines, and the lead line connected to the other one of the at least two adjacent word lines is located at the second end P2 of the other one of the at least two adjacent word lines ~ S52

FIG. 5

THREE-DIMENSIONAL MEMORY AND METHOD FOR FORMING SAME

CROSS-REFERENCE OF RELATED APPLICATIONS

The present application is a U.S. continuation application of International Application No. PCT/CN2022/096757, filed on Jun. 2, 2022, which claims priority to Chinese Patent Application No. 202210445304.3, filed on Apr. 26, 2022. International Application No. PCT/CN2022/096757 and Chinese Patent Application No. 202210445304.3 are incorporated herein by reference in their entireties.

BACKGROUND

A Dynamic Random Access Memory (DRAM) is a semiconductor device commonly used in electronic devices such as computers, which consists of a plurality of memory cells. Each of the memory cells usually includes a transistor and a capacitor. A gate of the transistor is electrically connected to a word line, a source is electrically connected to a bit line, and a drain is electrically connected to the capacitor. The word line voltage on the word line can control the turn-on and turn-off of the transistor, so that data information stored in the capacitor can be read or data information can be written into the capacitor through the bit line.

In a three-dimensional memory, such as the DRAM, it is generally necessary to provide lead lines that are connected to the word lines to transmit external control signals to the word lines. However, in the current three-dimensional memory, each lead line connected to each word line is located at the same end of each of the word lines, which results in a short distance between adjacent lead lines and a shone, capacitance parasitic effect between the adjacent lead lines, thereby affecting the electrical performance of the memory.

Therefore, how to reduce the capacitance parasitic effect between adjacent lead lines to improve the performance of the three-dimensional memory is an urgent technical problem to be solved at present.

SUMMARY

The disclosure relates to the technical field of semiconductor manufacturing, and in particular to a three-dimensional memory and a method for forming the same.

Some examples of the present disclosure provide a throe-dimensional memory and a method for forming the same to reduce parasitic capacitance effect between adjacent lead lines, thereby improving the performance of the three-dimensional memory.

According to some examples, the disclosure provides a three-dimensional memory, which includes a substrate, a plurality of word lines and a plurality of lead lines.

The plurality of word lines are located on the substrate. Each of the word lines extends in a first direction, and each of the word lines includes a first end and a second end opposite to the first end along the first direction. The plurality of word lines are spaced apart away from each other in a direction perpendicular to a top surface of the substrate. The first direction is a direction parallel to the top surface of the substrate.

The plurality of lead lines are located on the substrate. Each of the lead lines extends in the direction perpendicular to the top surface of the substrate. The plurality of lead lines are connected to the plurality of word lines in one-to-one correspondence. There are at least two adjacent ones of the word lines in the direction perpendicular to the top surface of the substrate, in which the lead line connected to one of the at least two adjacent word lines is located at the first end of the one of the at least two adjacent word lines, and the lead line connected to the other one of the at least two adjacent word lines is located at the second end of the other one of the at least two adjacent word lines.

According to some other examples, the disclosure further provides a method for forming a three-dimensional memory, which includes the following operations.

A substrate and a plurality of word lines located on the substrate are formed. Each of the word lines extends in a first direction, and each of the word lines comprises a first end and a second end opposite to the first end along the first direction. The plurality of word lines are spaced apart away from each other in a direction perpendicular to a top surface of the substrate. The first direction is a direction parallel to the top surface of the substrate.

A plurality of lead lines located on the substrate are formed. Each of the lead lines extends in the direction perpendicular to the top surface of the substrate. The plurality of lead lines are connected to the plurality of word lines in one-to-one correspondence. There are at least two adjacent ones of the word lines in the direction perpendicular to the top surface of the substrate, in which the lead line connected to one of the at least two adjacent word lines is located at the first end of the one of the at least two adjacent word lines, and the lead line connected to the other one of the at least two adjacent word lines is located at the second end of the other one of the at least two adjacent word lines.

BRIEF DESCRIPTION OF THE DRAWINGS

FIG. 5 shows a flow chart of a method for forming a three-dimensional memory according to a specific embodiment of the present disclosure.

DETAILED DESCRIPTION

Specific embodiments of the three-dimensional memory and the method for forming the same provided by the present disclosure will be described in detail below with reference to the drawings.

Figure 1:
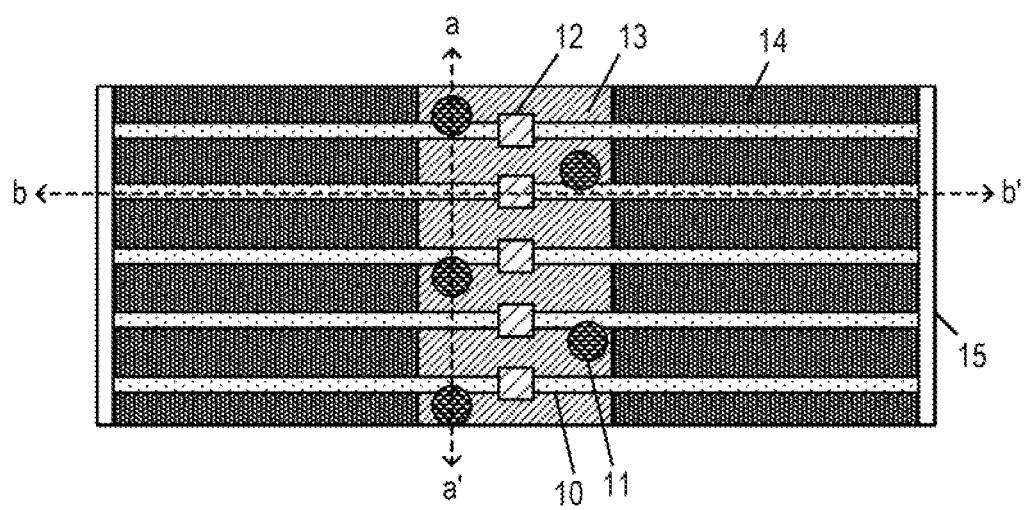
FIG. 1 shows a top-view structural schematic diagram of a three-dimensional memory according to a specific embodiment of the present disclosure.
Figure 2:
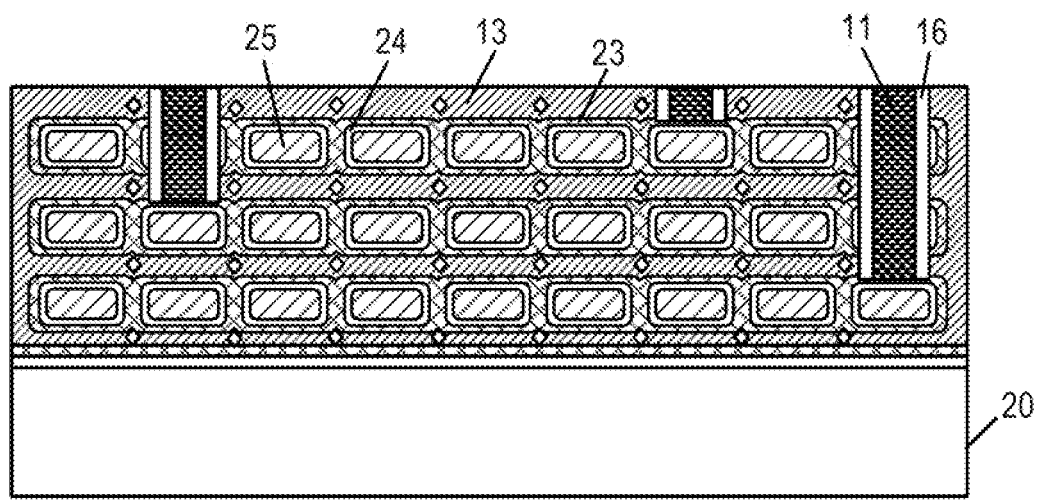
FIG. 2 shows a schematic cross-sectional view of a three-dimensional memory according to a specific embodiment of the present disclosure along the direction a-a' shown in FIG. 1.
Figure 3:
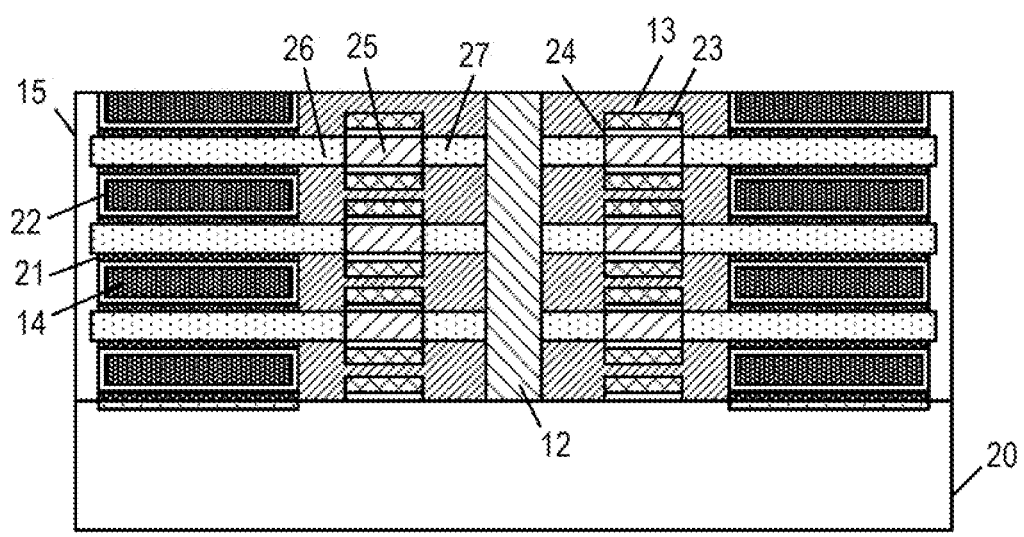
FIG. 3 shows a schematic cross-sectional view of a three-dimensional memory according to a specific embodiment of the present disclosure along the direction b-b' shown in FIG. 1.
Figure 4A:
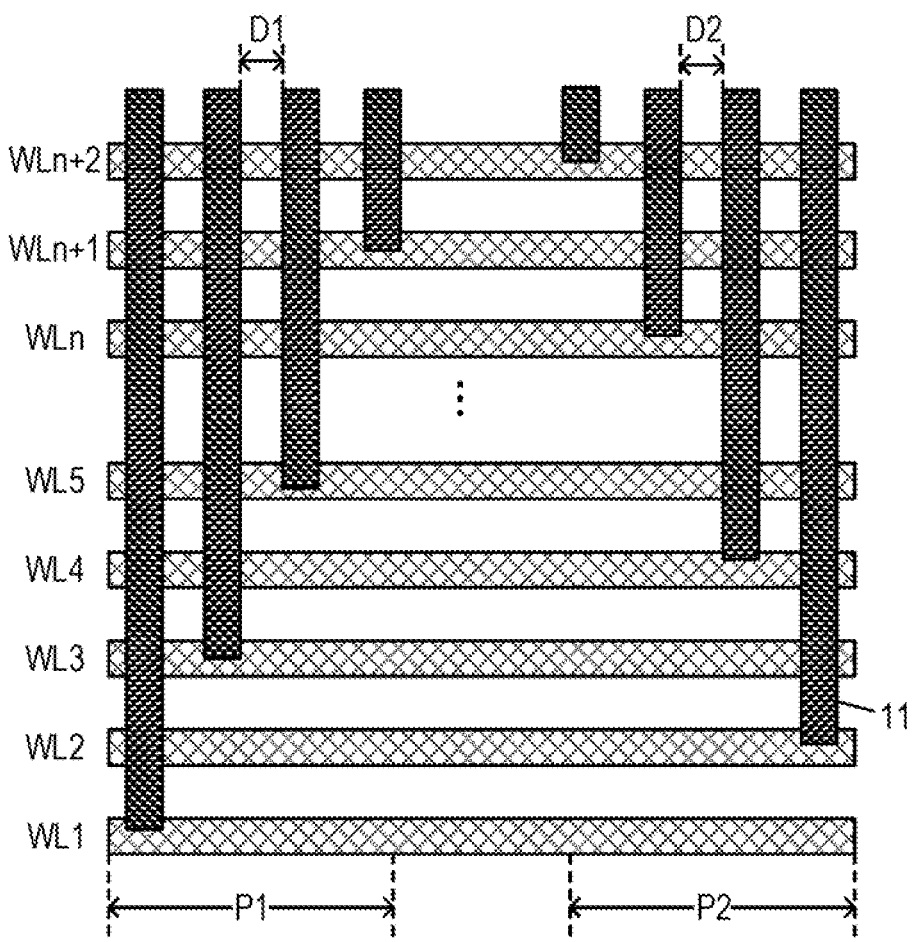
FIG. 4A to FIG. 4B show schematic diagrams of the positional relationship between the word lines and the lead lines in a three-dimensional memory according to a specific embodiment of the present disclosure.
Figure 4B:
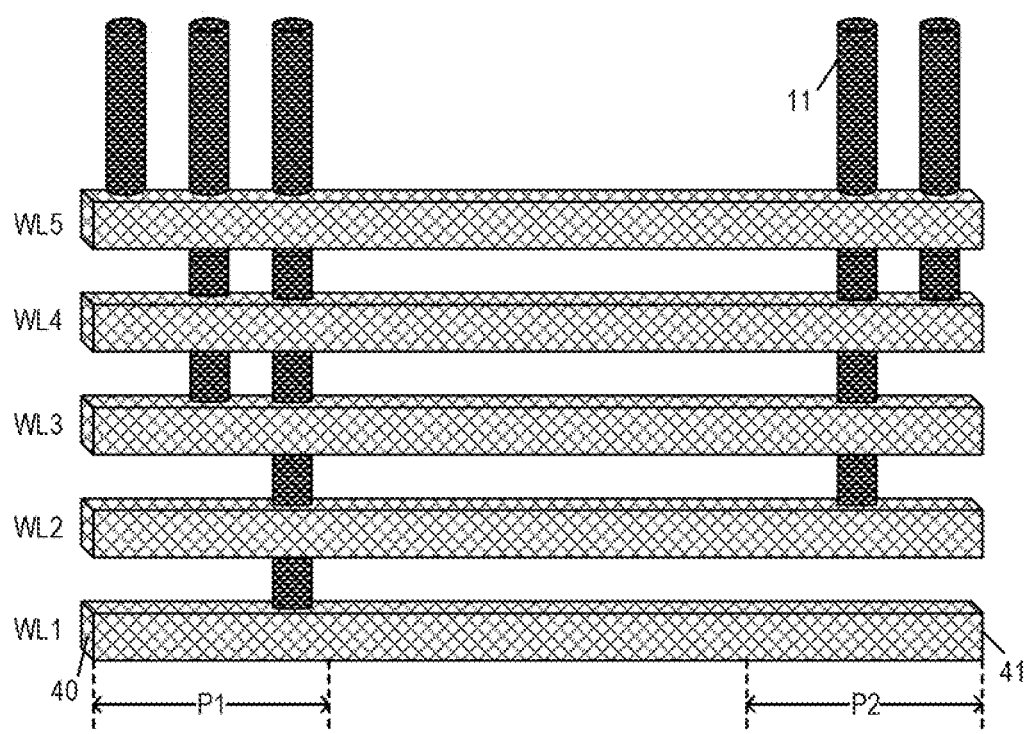

A specific embodiment provides a three-dimensional memory FIG. 1 shows a top-view structural schematic diagram of the three-dimensional memory according to the specific embodiment of the present disclosure. FIG. 2 shows a schematic cross-sectional view of the three-dimensional memory according to the specific embodiment of the present disclosure along the direction a-a' shown in FIG. 1. FIG. 3 shows a schematic cross-sectional view of the three-dimensional memory according to the specific embodiment of the present disclosure along the direction b-b' shown in FIG. 1. FIG. 4A to FIG. 4B show schematic diagrams of the positional relationship between the word lines and the lead lines in the three-dimensional memory according to the specific embodiment of the present disclosure. The three-dimensional memory described in this specific embodiment may be, but is not limited to, a DRAM memory. As shown in FIG. 1 to FIG. 3 and FIG. 4A to FIG. 4B, the three-dimensional memory includes a substrate 20, a plurality of word lines 23, and a plurality of lead lines 11.

The plurality of word lines 23 are located on the substrate 20. Each of the word lines 23 extends in a first direction a-a', and each of the word lines 23 includes a first end P1 and a second end P2 opposite to the first end P1 along the first direction a-a'. The plurality of word lines 23 are spaced apart away from each other in a direction perpendicular to the top surface of the substrate 20. The first direction a-a' is a direction parallel to the top surface of the substrate 20.

The plurality of lead lines 11 are located on the substrate 20. Each of the lead lines 11 extends in the direction perpendicular to the top surface of the substrate 20. The plurality of lead lines 11 are connected to the plurality of word lines 23 in one-to-one correspondence. There are at least two adjacent ones of the word lines 23 in the direction perpendicular to the top surface of the substrate 20, in which the lead line 11 connected to one of the at least two adjacent word lines 23 is located at the first end P1 of the one of the at least two adjacent word lines 23, and the lead line 11 connected to the other one of the at least two adjacent word lines 23 is located at the second end P2 of the other one of the at least two adjacent word lines 23.

Specifically, the substrate 20 may be, but is not limited to a silicon substrate. As an example, the present embodiment is described with a silicon substrate as the substrate 20. In other examples, the substrate 20 may be a semiconductor substrate such as gallium nitride, gallium arsenide, gallium carbide, silicon carbide or SOI. The substrate 20 is used for supporting a device structure on its top surface. On the top surface of the substrate 20, a plurality of first semiconductor layers spaced apart along a direction perpendicular to the top surface of the substrate 20 are provided. Each of the first semiconductor layers includes a plurality of active pillars 10 spaced apart along the first direction a-a'. Each of the active pillars 10 includes a channel area 25 and a drain area 26 and a source area 27 arranged on opposite sides of the channel area 25 along a second direction b-b'. Each of the word lines 23 extends in the first direction a-a' and each of the word lines 23 continuously covers a plurality of channel areas 25 spaced apart along the first direction a-a' in one of the first semiconductor layers. A gate dielectric layer 24 is also provided between the word line 23 and the channel area 25. The material of the channel area 25 may be monocrystalline silicon, polysilicon, indium gallium zinc oxide (IGZO), monocrystalline Si, monocrystalline Ge, or monocrystalline silicon germanium (SiGe). The material of the gate dielectric layer 24 to may be a high-K dielectric material, silicon oxide ($SiO_2$), silicon nitride (SiN), silicon oxynitride (SiON), or a combination thereof. The high-K dielectric material may include hafnium oxide ($HfO_2$), hafnium silicon oxide ($HfSiO_2$), lanthanum oxide (LaO), zirconia ($ZrO_2$), zirconia silicon ($ZrSiO_2$), tantalum oxide ($Ta_2O_5$), titanium oxide ($TiO_2$), barium strontium titanium oxide ($BaSrTiO_3$), barium titanium oxide ($BaTiO_3$), strontium titanium oxide ($SrTiO_3$, STO), lithium oxide ($Li_2O$), alumina ($Al_2O_3$), lead scandium tantalum oxide (PbScTaO), lead zinc niobate ($PbZnNbO_3$) or a combination thereof. On the top surface of the substrate 20, a capacitor structure is also provided, which includes a capacitor. The capacitor includes a lower electrode layer 21, a dielectric layer 22 covering the surface of the lower electrode layer 21, and an upper electrode layer 14 covering the surface of the dielectric layer 22. On the top surface of the substrate 20, a bit line 12 is further provided, which extends in a direction perpendicular to the top surface of the substrate 20. The capacitor is electrically connected to the drain area 26 and the bit line 12 is electrically connected to the source area 27. On the top surface of the substrate 20, supporting pillars 15 for supporting the first semiconductor layers are also provided, so as to improve the stability of the overall structure of the three-dimensional memory. The material of the bit line 12 may include a conductive material, for example, doped Si, doped Ge, titanium nitride (TiN), tantalum nitride (TaN), tungsten (W), titanium (Ti), tantalum (Ta), copper (Cu), aluminum (Al), silver (Ag), gold (Au), tungsten silicide (WSi), cobalt silicide (CoSi), titanium silicide (TiSi), or a combination thereof.

In an example, a metal silicide may be formed as an ohmic contact layer between the capacitor and the drain area 26 and between the bit line 12 and the source area 27 to reduce the contact resistance between the capacitor and the drain area 26 and the contact resistance between the bit line 12 and the source area 27, respectively.

In an example, the support pillar 15 is located on the side of the capacitor facing away from the drain area 26, and the first semiconductor layer is partially inserted into the support pillar 15 to further improve the support performance of the support pillar 15 to the three-dimensional memory.

The lead lines 11 are located on the top surface of the substrate 20. Each of the lead lines 11 extends along the direction perpendicular to the top surface of the substrate 20. Moreover, the bottom surface of each of the lead lines 11 is electrically connected to one of the word lines 23, and the top surface of each of the lead lines 11 is used for connecting external control signals. A plurality of word lines 23 are spaced apart away from each other in a direction perpendicular to the top surface of the substrate 20. For any two adjacent ones of the word lines 23, the lead line 11 connected to one of the any two adjacent word lines 23 is located at the first end P1 of the one of the any two adjacent word lines 23, and the lead line 11 connected to the other one of the any two adjacent word lines 23 is located at the second end P2 of the other one of the any two adjacent word lines 23. That is, the lead lines of two adjacent word lines are respectively arranged at two ends of the word lines, so that the arrangement density of the plurality of lead lines 11 is reduced, and the distance between the adjacent lead lines 11 is increased, thereby reducing the parasitic capacitance effect between the plurality of lead lines 11, and improving the electric performance of the three-dimensional memory.

In some examples, all of the word lines 23 spaced apart away from each other along the direction perpendicular to the top surface of the substrate 20 are sequentially numbered. The lead lines 11 connected to the word lines 23 which are odd-numbered are all located at the first ends P1 of the word lines 23 which are odd-numbered, and the lead lines 11 connected to the word lines 23 which are even-numbered are all located at the second ends P2 of the word lines 23 which are even-numbered.

FIG. 4A shows a schematic diagram of the positional relationship between the word lines and the lead lines in a three-dimensional memory according to a specific embodiment of the present disclosure. FIG. 4B is a stereo structural schematic diagram of the positional relationship between word lines and the lead lines in the three-dimensional memory according to a specific embodiment of the present disclosure. For example, as shown in FIG. 4A and FIG. 4B, the three-dimensional memory includes a first word line WL1, a second word line WL2, a third word line WL3, a fourth word line WL4, . . . , an $n^{th}$ word line WLn, an $n+1^{th}$ word line WLn+1, and an $n+2^{th}$ word line WLn+2, where n is a positive integer. The first word line WL1, the second word line WL2 . . . , and the $n+2^{th}$ word line WLn+2 are spaced apart away from each other in a direction perpendicular to the top surface of the substrate 20. Herein, the lead lines 11 connected to the word lines which are odd-numbered (such as the first word line WL1, the third word line WL3, the fifth word line WL5) are all located at the first end P1 of each of the word lines which are odd-numbered, and the lead lines 11 connected to the word lines 23 which are even-numbered (such as the second word line WL2, the fourth word line WL4) are alt located at the second end P2 of each of the word lines 23 which are even-numbered. By arranging the lead lines 11 connected to the word lines 23 which are odd-numbered and the lead lines 11 connected to the word lines 23 which are even-numbered respectively at two ends of the word lines 23, it is possible not only to reduce the parasitic capacitance effect between the lead lines 11, but also to simplify the manufacturing process of the plurality of lead lines 11.

In some examples, each of the word lines 23 includes a first terminal face 40 and a second terminal face 41 opposite to the first terminal face 40 along the first direction a-a'. The first terminal faces 40 of all of the word lines 23 spaced apart away from each other in the direction perpendicular to the top surface of the substrate 20 are aligned, and the second terminal faces 41 of all of the word lines 23 are aligned.

In some examples, for any two of the word lines 23 spaced apart away from each other along the direction perpendicular to the top surface of the substrate 20, the lead line 11 connected to one of the any two word lines 23 closer to the substrate 20 penetrates through the other one of the any two word lines 23. The three-dimensional memory further includes an isolation layer 16, which covers the sidewall of the lead line 11.

Specifically, the first terminal faces 40 of all of the word lines 23 spaced apart away from each other in the direction perpendicular to the top surface of the substrate 20 are aligned, and the second terminal faces 41 of all of the word lines 23 are aligned, without forming a stair structure at the ends of the plurality of word lines 23, thereby simplifying the manufacturing process of the three-dimensional memory and also being helpful for increasing the storage density of the three-dimensional memory. In order to prevent the lead line 11 connected to a lower word line 23 from interfering with an upper word line 23, the sidewall of the lead line 11 is covered with the isolation layer 16. The bottom surface of the lead line 11 is electrically connected to the word line 23, and the sidewall of the lead line 11 is electrically isolated from other word lines 23 through the isolation layer 16. The material of the isolation layer 16 may be but is not limited to an oxide material (e.g., silicon dioxide). The isolation layer 16 is not shown in FIG. 4A and FIG. 4B in order to clearly show the relative positional relationship between the word lines and the lead lines.

In order to further simplify the structure of the three-dimensional memory, in some examples, depths of the plurality of lead lines 11 connected to the plurality of word lines 23 which are odd-numbered gradually change along the first direction a-a'; and depths of the plurality of lead lines 11 connected to the plurality of word lines 23 which are even-numbered gradually change along the first direction a-a'.

In some examples, the depths of the plurality of lead lines 11 connected to the plurality of word lines 23 which are odd-numbered are gradually reduced in a direction parallel to a direction of the first end P1 pointing to the second end P2 of one of the word lines 23; and the depths of the plurality of lead lines 11 connected to the plurality of word lines 23 which are even-numbered are gradually reduced in a direction parallel to a direction of the second end P2 pointing to the first end P1 of one of the word lines 23.

In some examples, the plurality of lead lines 11 connected to the plurality of word lines 23 which are odd-numbered are equally spaced along the first direction a-a'; and the plurality of lead lines 11 connected to the plurality of word lines 23 which are even-numbered are equally spaced along the first direction a-a'.

In order to reduce the number of the masks and thus reduce the cost for manufacturing the three-dimensional memory, in some examples, in the first direction a-a', a distance D1 between two lead lines 11 connected to two adjacent ones of the word lines 23 which are odd-numbered is equal to a distance D2 between two lead lines 11 connected to two adjacent ones of the word lines 23 which are even-numbered.

In order to enhance the stability of the connection between the word lines 23 and the lead lines 11 in some examples, a bottom surface of the lead line 11 connected to one of the word lines 23 is completely located on the word line 23.

In some other examples, the bottom surface of the lead line 11 connected to one of the word lines 23 is partially located on the word line 23.

Specifically, the bottom surface of the lead line 11 is only partially located on the word line 23. For example, in a direction perpendicular to the top surface of the substrate 20, the overlapping area between the projection of the bottom surface of the lead line 11 and the projection of the word line 23 is greater than or equal to 60% of the total area of the projection of the bottom surface of the lead line 11. With this configuration, while ensuring the stable electrical connection between the lead line 11 and the word line 23, the process window when the lead line 11 is formed can be enlarged, so that the tolerance of the manufacturing process of the three-dimensional memory can be increased, and it is helpful to improve the yield of the three-dimensional memory.

In this specific embodiment, as an example, the lead line 11 is arranged on the surface of the word line 23 in a lap joint way (that is, the lead line 11 is in contact with the top surface of the word line 23 facing away from the substrate 20). In other specific embodiments, the lead line 11 may be embedded inside the word line 23, thereby increasing the contract area between the lead line 11 and the word line 23 and reducing the contact resistance between the lead line 11 and the word line 23.

In order to further reduce the parasitic capacitance effect between the plurality of lead lines, in some examples, each of the word lines 23 includes a third end and a fourth end opposite to the third end along a second direction, and the second direction is a direction parallel to the top surface of the substrate 20 and intersecting the first direction a-a'. The bottom surface of the lead line 11 connected to the word line 23 which is odd-numbered is partially located at the third end. The bottom surface of the lead line 11 connected to the word line 23 which is even-numbered is partially located at the fourth end.

The intersection described in the specific embodiment ma a vertical intersection or an oblique intersection.

In order to simplify the manufacturing process, in some examples, each of the word lines 23 includes a third end and a fourth end opposite to the third end along a second direction, and the second direction is a direction parallel to the top surface of the substrate 20 and intersecting the first direction a-a'. The bottom surface of the lead line 11 connected to any of the word lines 23 is partially located at the third end.

Figure 6A:
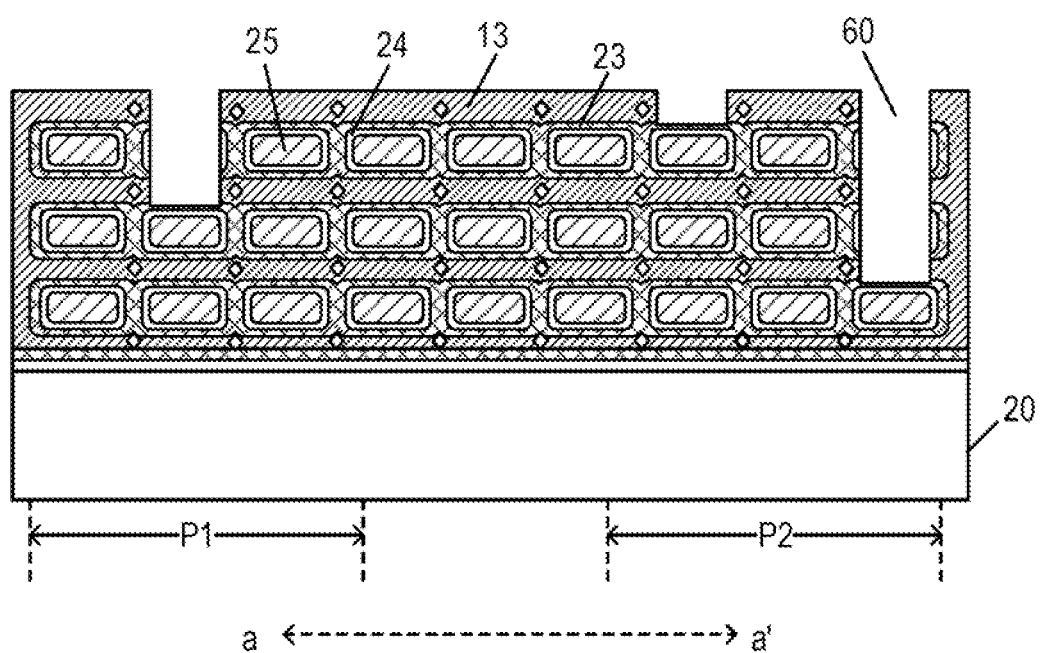
FIG. 6A to FIG. 6C show schematic cross-sectional views of main processes during forming a three-dimensional memory according to a specific embodiment of the present disclosure.
Figure 6B:
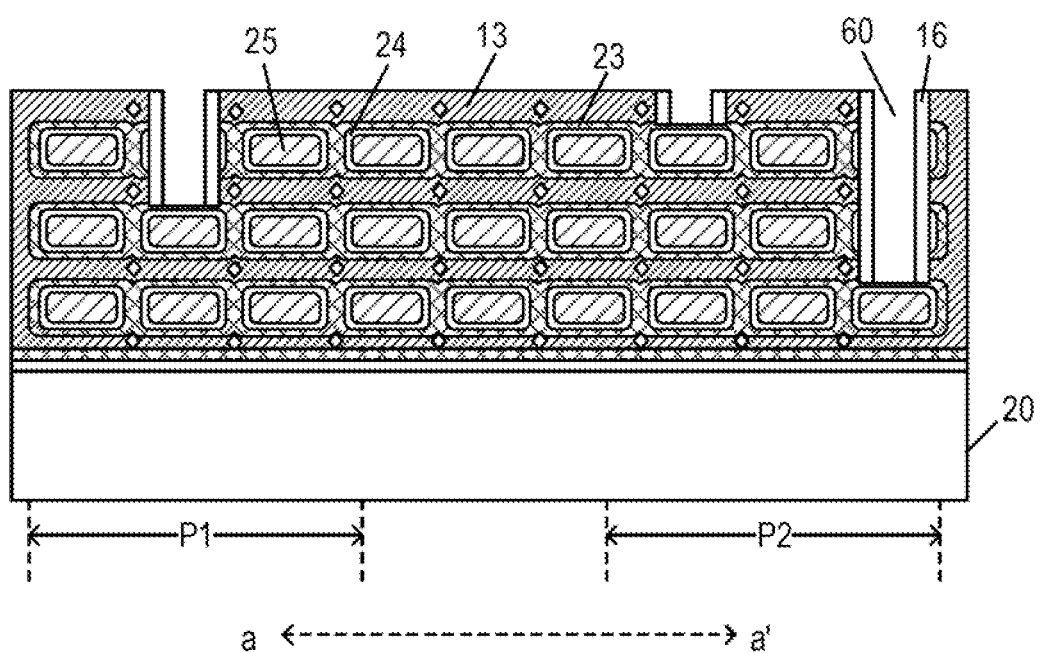
Figure 6C:
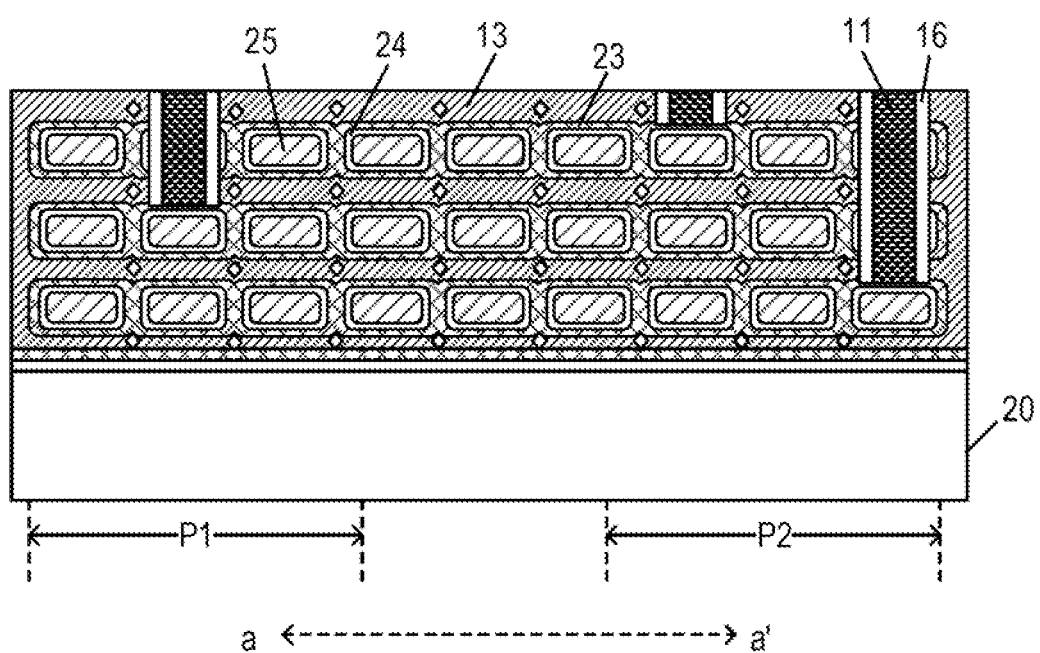

A specific embodiment of the disclosure provides a method for forming a three-dimensional memory. FIG. 5 shows a flow chart of a method for forming a three-dimensional memory according to a specific embodiment of the present disclosure. FIG. 6A to FIG. 6C show schematic cross-sectional views of main processes during forming a three-dimensional memory according to a specific embodiment of the present disclosure. The structure of the three-dimensional memory formed in the specific embodiment can be referred to FIG. 1 to FIG. 3 and FIG. 4A to FIG. 4B. As shown in FIG. 1 to FIG. 3, FIG. 4A to FIG. 4B, FIG. 5 and FIG. 6A to FIG. 6C, the method for forming a three-dimensional memory includes the following operations.

At S51, substrate 20 is formed, and a plurality of word lines 23 are formed on the substrate 20, in which each of the word lines 23 extends in a first direction a-a', and each of the word lines 23 includes a first end P1 and a second end P2 opposite to the first end P1 along the first direction a-a', the plurality of word lines 23 are spaced apart away front each other in a direction perpendicular to the top surface of the substrate 20, and the first direction a-a' is a direction parallel to the top surface of the substrate 20. Reference may be made to FIG. 6A, FIG. 4A and FIG. 4B.

At S52, a plurality of lead lines 11 are formed on the substrate 20, in which each of the lead lines 11 extends in the direction perpendicular to the top surface of the substrate 20, the plurality of lead lines 11 are connected to the plurality of word lines 23 in one-to-one correspondence, and there are at least two adjacent ones of the word lines 23 in the direction perpendicular to the top surface of the substrate 20, in which the lead line 11 connected to one of the at least two adjacent word lines 23 is located at the first end P1 of the one of the at least two adjacent word lines 23, and the lead line 11 connected to the other one of the at least two adjacent word lines 23 is located at the second end P2 of the other one of the at least two adjacent word lines 23. Reference may be made to FIG. 6C, FIG. 1 to FIG. 3, FIG. 4A and FIG. 4B.

In some examples, the specific operations for forming the substrate 20 and the plurality of word lines 23 located at the substrate 20 include the following operations.

The substrate 20 and a stacked layer on the substrate 20 are formed. The stacked layer includes a first semiconductor layer and a second semiconductor layer stacked alternately in a direction perpendicular to the top surface of the substrate 20. The thickness of the second semiconductor layer is D1. The first semiconductor layer includes a plurality of channel areas 25 arranged along the first direction a-a', and a source area 27 and a drain area 26 arranged on opposite sides of each of the channel areas 25 along, the second direction b-b'. Both the first direction a-a' and the second direction b-b' are parallel to the top surface of the substrate, and the first direction a-a' intersects the second direction b-b'.

A plurality of first openings respectively exposing the plurality of channel regions 25 are formed in the second semiconductor layer. A width of a gap between two adjacent first openings in the first direction a-a' is D2, and the thickness D1 of the second semiconductor layer is greater than the width D2 of the gap between two adjacent first openings in the first direction a-a'. By setting the thickness of the second semiconductor layer to be greater than the width of the gap between two adjacent first openings in the first direction a-a', it is allowed that when the conductive material is deposited, the conductive material in the plurality of first openings arranged along the first direction a-a' is first connected into a line, thereby simplifying the process operations for forming a horizontal word line.

A conductive material is deposited along the first openings and forming the word lines 23 extending along the first direction a-a' and continuously covering the plurality of channel areas 25 arranged along the first direction a-a'.

In some examples, the specific operation for forming, the word lines 23 extending along the first direction a-a' and continuously covering the plurality of channel areas 25 arranged along the first, direction a-a' includes the following operation.

The conductive material is deposited along the plurality of first openings to form the plurality of word lines 23 spaced apart away from each other along the direction perpendicular to the top surface of the substrate 20. Herein, each of the word lines 23 includes a first terminal face 40 and a second terminal face 41 opposite to the first terminal face 40 along the first direction a-a'. The first terminal faces 40 of all of the word lines 23 spaced apart away from each other in the direction perpendicular to the top surface of the substrate 20 are aligned, and the second terminal faces 41 of all of the word lines are aligned.

Specifically, the material of the first semiconductor layer may be silicon, and the material of the second semiconductor layer may be SiGe. The first semiconductor layer and the second semiconductor layer stacked alternately in a direction perpendicular to the top surface of the substrate 20 may be formed by atomic layer deposition to form the stacked layer having a superlattice stack structure. Herein, the specific number of layers of the first semiconductor layer and the second semiconductor layer deposited alternately can be selected by those skilled in the art according to the actual requirements. Thereafter, the second semiconductor layer is etched to form the first openings exposing the channel areas 25 in the first semiconductor layer.

In some examples, for simplifying the manufacturing process, a conductive material such as tungsten can be deposited along the plurality of first openings by selective atomic layer deposition, to directly form the plurality of word lines 23 spaced apart away from each other in a direction perpendicular to the top surface of the substrate 20. Each of the word lines 23 extends in the first direction a-a' and continuously covers the plurality of channel areas 25 arranged in the first direction a-a'. Here, the edge of each of the word lines 23 along the second direction b-b' is aligned with the edge of the channel area 25 covered by the word line.

In another example, in order to fully avoid the connection of two adjacent word lines 23 in a direction perpendicular to the top surface of the substrate 20, a conductive material such as tungsten can be deposited along the plurality of first openings by atomic layer deposition to form an initial conductive layer. The initial conductive layer includes at first part extending along the first direction a-a' and continuously covering a plurality of channel areas 25 arranged along the first direction a-a', and a second part extending, in the direction perpendicular to the top surface of the substrate 20 and connected to the first part. Thereafter, the second part may be completely removed by etching, and the remaining first part serves as the word lines 23. Here, order to completely remove the second part, part of the first part may be removed while the second part is removed, so that the channel areas 25 protrude relative to the word lines 23 in the first direction a-a'.

In some examples, the specific operations for forming the plurality of lead lines 11 on the substrate 20 include the following operations.

A dielectric layer 13 covering surfaces of the word lines 23 and filling up gaps between adjacent word lines 23 is formed.

The dielectric layer 13 and part of the word lines 23 are etched, and a plurality of lead trenches 60 that expose a plurality of word lines 23 respectively are formed. Herein, there are at least two adjacent word lines 23 in the direction perpendicular to the top surface of the substrate 20, in which the lead trench 60 exposing one of the at least two adjacent word lines 23 is located at the first end P1 of the one of the at least two adjacent word lines, and the lead trench exposing the other one of the at least two adjacent word lines 23 is located at the second end P2 of the other one of the at least two adjacent word lines 23, as shown in FIG. 6A.

The conductive material is filled in the lead trenches 60 to form the lead lines 11, as shown in FIG. 6C.

In some examples, the specific operations for forming the lead lines 11 include the following operations.

An isolation layer 16 covering the sidewall of the lead trench 60 is formed, as shown in FIG. 6B.

The conductive material is filled in the lead trench 60 to form the lead line 11 which covers an exposed, surface of the word line 23 and a surface of the isolation layer 16.

Specifically, after a structure, in which the first terminal faces 40 of all of the word lines 23 spaced apart away from each other in the direction perpendicular to the top surface of the substrate 20 are aligned and the second terminal faces 41 of all of the word lines 23 are aligned, is formed, the dielectric layer 13 may be deposited directly, without etching the word lines 23. Thereafter, part oldie dielectric layer 13 and part of the word lines 23 are etched in a direction perpendicular to the top surface of the substrate 20 by dry etching to form the plurality of lead trenches 60 respectively exposing the plurality of word lines 23. For any two adjacent ones of the word lines 23, the lead trench 60 exposing one of the any two adjacent word lines 23 closer to the substrate 20 penetrates through the other one of the any two adjacent word lines 23. Next, an electrical insulating material such as silicon dioxide is deposited on the sidewalls and bottoms of the lead trenches 60. Thereafter, the electrical insulating material at the bottoms of the lead trenches 60 is etched back, and the electrical insulating material remaining on the sidewalls of the lead trenches 60 serves as the isolation layer According to the present specific embodiment, the isolation layer 16 is formed on the sidewalls of the lead trenches 60 by using an electrical insulating material (for example, silicon dioxide), so that the sidewalls of the lead lines 11 can be electrically isolated from other word lines 23.

In some examples, all of the word lines spaced apart away from each other in the direction perpendicular to the top surface of the substrate are sequentially numbered. Herein, the specific operation for forming the plurality of lead trenches that expose the plurality of word lines respectively includes the following operation.

The dielectric layer 13 and part of the word lines 23 are etched to form the plurality of lead trenches 60, Herein, the lead trenches 60 exposing the word lines 23 which are odd-numbered are located at the first ends P1 of the word lines 23 which are odd-numbered, and the lead trenches 60 exposing the word lines 23 which are even-numbered are located at the second ends P2 of the word lines 23 which are even-numbered.

Specifically, By arranging the lead lines 11 exposing the word lines 23 which are odd-numbered and the lead lines 11 exposing the word lines 23 which are even-numbered respectively at two ends of the word lines 23, it is allowed that two lead lines, which will be formed subsequently, connected to any two adjacent word lines 23 are arranged at opposite ends of the word lines 23, so that not only the parasitic capacitance effect between the lead lines 11 can be reduced, but also the manufacturing process of the plurality of lead lines 11 can be simplified.

In some examples, the specific operation for forming the plurality of lead trenches 60 that expose the plurality of word lines 23 respectively includes the following operation.

The dielectric layer 13 and part of the word lines 23 are etched to form the plurality, of lead trenches 60. Herein, depths of the lead trenches 60 exposing the plurality of word lines 23 which are odd-numbered gradually change along the first direction a-a', and depths of the lead trenches 60 exposing the plurality of word lines 23 which are even-numbered gradually change along the first direction a-a'.

In some examples, the depths of the plurality of lead trenches 60 exposing the plurality of word lines 23 which are odd-numbered respectively are gradually reduced in a direction parallel to a direction of the first end P1 pointing to the second end P2 of one of the word lines 23. The depths of the plurality of lead lines 11 connected to the plurality of word lines 23 which are even-numbered are gradually reduced in a direction parallel to a direction of the second end P2 pointing to the first end P1 of one of the word lines 23.

In some examples, the specific operation for forming the plurality of lead trenches 60 that expose the plurality of word lines 23 respectively includes the following operation.

The dielectric layer 13 and part of the word lines 23 are etched to form the plurality of lead trenches 60. Herein, the lead trenches 60 exposing the plurality of word lines 23 which are odd-numbered respectively are equally spaced along the first direction a-a', and the lead trenches 60 exposing the plurality of word lines 23 which are even-numbered respectively are equally spaced along the first direction a-a'.

In some examples, in the first direction a-a', a distance between two lead lines 11 connected to two adjacent ones of the word lines 23 which are odd-numbered is equal to a distance between two lead lines 11 connected to two adjacent ones of the word lines 23 which are even-numbered.

In some examples, the specific operation for forming the plurality of lead trenches 60 that expose the plurality of word lines 23 respectively includes the following operation.

The dielectric layer 13 and part of the word lines 23 are etched to form the plurality of lead trenches 60, in which a bottom of the lead trench 60 only exposes the word line 23.

Specifically, only the word line 23 is exposed at the bottom of the lead trench 60 by the alignment etching process, so that the bottom surface of each of the lead lines 11 to be formed in the lead trenches 60 is completely located on the surface of the word line 23, thereby further enhancing the connection stability between the lead lines 11 and the word lines 23.

In some examples, the specific operation for forming the plurality of lead trenches 60 that expose the plurality of word lines 23 respectively includes the following operation.

The dielectric layer 13 and part of the word lines 23 are etched to form the plurality of lead trenches 60, in which a bottom of the lead trench 60 exposes part of the word line 23 and part of the dielectric layer 13.

Specifically, the bottom of the lead trench 60 exposes part of the word line 23 and part of the dielectric layer 13, so that the bottom surface of the lead line 11 formed in the lead trench 60 is partially located on the surface of the word line 23, and partially located on the surface of the dielectric layer 13. For example, in a direction perpendicular to the top surface of the substrate 20, the overlapping area between the projection of the bottom surface of the lead line 11 and the projection of the word line 23 is greater than or equal to 60% of the total area of the projection of the bottom surface of the lead line 11. With this configuration, while ensuring the stable electrical connection between the lead line 11 and the word line 23, the process window when the lead trench 60 is formed can be enlarged, so that the tolerance of the manufacturing process of the three-dimensional memory can be increased, and it is helpful to improve the yield of the three-dimensional memory.

In the specific embodiment, as an example, the word line 23 is used as an etch-stopping layer during forming the lead trench 60 by etching, so that the lead trench 60 stops at the surface of the word line 23, and the lead line 11 formed in the lead trench 60 is arranged on the surface of the word line 23 in a lap joint way (that is, the lead line 11 is in contact with the top surface of the word line 23 facing away from the substrate 20). In other specific embodiments, the lead trench 60 may extend to the inside of the word line 23, so that the lead line 11 formed in the lead trench 60 may also be embedded inside the word line 23, thereby increasing the contact area between the lead line 11 and the word line 23 and reducing the contact resistance between the lead line 11 and the word line 23.

In some examples, each of the word lines 23 comprises a third end and a fourth end opposite to the third end along a second direction b-b'. Herein, the specific operation for forming the plurality of lead trenches 60 that expose the plurality of word lines 23 respectively includes the following operation.

The dielectric layer 13 and part of the word lines 23 are etched to form the plurality of lead trenches 60. Herein, a bottom of the lead trench 60 on a surface of the word line 23 which is odd-numbered partially exposes the third end and partially exposes the dielectric layer 13, and a bottom of the lead trench 60 on a surface of the word line 23 which is even-numbered partially exposes the fourth end and partially exposes the dielectric layer 13.

Some examples of the specific embodiments provide a three-dimensional memory and a method for forming the same. There are at least two adjacent ones of the word lines in the direction perpendicular to the top surface of the substrate, in which the lead line connected to one of the at least two adjacent word lines is located at the first end of the one of the at least two adjacent word lines, and the lead line connected to the other one of the at least two adjacent word lines is located at the second end of the other one of the at least two adjacent word lines. In this way, the lead lines of two adjacent word lines are respectively arranged at two ends of the word lines, and a misaligned lead line structure is achieved, thereby increasing the distance between any two adjacent lead lines and reducing the capacitance parasitic effect between any adjacent lead lines. In addition, the disclosure adopts a misaligned lead line structure formed at two ends of the word lines without forming a stair structure at the ends of the word lines, which not only simplifies the manufacturing process of the memory, but also helps to increase the storage density of the memory.

The descriptions above are only some preferred embodiments of the present disclosure. It should be noted that some improvements and modifications may be made by one of ordinary skill in the art without departing from the principles of the present disclosure, and such improvements and modifications should be construed as falling into the scope of protection of the present disclosure.

The invention claimed is:

1. A three-dimensional memory, comprising:
   a substrate;
   a plurality of word lines located on the substrate, each of the word lines extending in a first direction, and each of the word lines comprising a first end and a second end opposite to the first end along the first direction, the plurality of word lines being spaced apart away from each other in a direction perpendicular to a top surface of the substrate, the first direction being a direction parallel to the top surface of the substrate;
   a plurality of lead lines located on the substrate, each of the lead lines extending in the direction perpendicular to the top surface of the substrate, the plurality of lead lines being connected to the plurality of word lines in one-to-one correspondence, there being at least two adjacent ones of the word lines in the direction perpendicular to the top surface of the substrate, wherein the lead line connected to one of the at least two adjacent word lines is located at the first end of the one of the at least two adjacent word lines, and the lead line connected to another one of the at least two adjacent word lines is located at the second end of the other one of the at least two adjacent word lines;
   wherein, for any two of the word lines spaced apart away from each other along the direction perpendicular to the top surface of the substrate, the lead line connected to one of the any two word lines closer to the substrate penetrates through another one of the any two word lines; and the three-dimensional memory further comprises:
   an isolation layer covering the sidewall of the lead line.

2. The three-dimensional memory according to claim 1, wherein the word lines spaced apart away from each other along the direction perpendicular to the top surface of the substrate are sequentially numbered, the lead lines connected to the word lines which are odd-numbered are all located at the first ends of the word lines which are odd-numbered, and the lead lines connected to the word lines which are even-numbered are all located at the second ends of the word lines which are even-numbered.

3. The three-dimensional memory according to claim 2, wherein depths of the plurality of lead lines connected to the plurality of word lines which are odd-numbered gradually changes along the first direction; and
   depths of the plurality of lead lines connected to the plurality of word lines which are even-numbered gradually change along the first direction.

4. The three-dimensional memory according to claim 3, wherein the depths of the plurality of lead lines connected to the plurality of word lines which are odd-numbered are gradually reduced in a direction parallel to a direction of the first ends pointing to the second ends of the word lines; and
   the depths of the plurality of lead lines connected to the plurality of word lines which are even-numbered are gradually reduced in a direction parallel to a direction of the second ends pointing to the first ends of the word lines.

5. The three-dimensional memory according to claim 2, wherein the plurality of lead lines connected to the plurality of word lines which are odd-numbered are equally spaced along the first direction; and
the plurality of lead lines connected to the plurality of word lines which are even-numbered are equally spaced along the first direction.

6. The three-dimensional memory according to claim 5, wherein, in the first direction, a distance between two lead lines connected to two adjacent ones of the word lines which are odd-numbered is equal to a distance between two lead lines connected to two adjacent ones of the word lines which are even-numbered.

7. The three-dimensional memory according to claim 1, wherein each of the word lines comprises a first terminal face and a second terminal face opposite to the first terminal face along the first direction; and
the first terminal faces of the word lines spaced apart away from each other in the direction perpendicular to the top surface of the substrate are aligned, and the second terminal faces of the word lines are aligned.

8. The three-dimensional memory according to claim 1, wherein a bottom surface of the lead line connected to the word line is completely located on the word line, or
wherein a bottom surface of the lead line connected to the word line is partially located on the word line.

9. A method for forming a three-dimensional memory, comprising:
forming a substrate and a plurality of word lines located on the substrate, each of the word lines extending in a first direction, and each of the word lines comprising a first end and a second end opposite to the first end along the first direction, the plurality of word lines being spaced apart away from each other in a direction perpendicular to a top surface of the substrate, the first direction being a direction parallel to the top surface of the substrate;
forming a plurality of lead lines located on the substrate, each of the lead lines extending in the direction perpendicular to the top surface of the substrate, the plurality of lead lines being connected to the plurality of word lines in one-to-one correspondence, there being at least two adjacent ones of the word lines in the direction perpendicular to the top surface of the substrate, wherein the lead line connected to one of the at least two adjacent word lines is located at the first end of the one of the at least two adjacent word lines, and the lead line connected to another one of the at least two adjacent word lines is located at the second end of the other one of the at least two adjacent word lines;
wherein the forming the substrate and the plurality of word lines located on the substrate comprises:
forming the substrate and a stacked layer on the substrate, the stacked layer comprising a first semiconductor layer and a second semiconductor layer stacked alternately in the direction perpendicular to the top surface of the substrate, a thickness of the second semiconductor layer being D1, the first semiconductor layer comprising a plurality of channel areas arranged along the first direction, and source areas and drain areas arranged on opposite sides of the channel areas along a second direction, both the first direction and the second direction being parallel to the top surface of the substrate, and the first direction intersecting the second direction;
forming a plurality of first openings in the second semiconductor layer respectively exposing the plurality of channel areas, a width of a gap between two adjacent ones of the first openings in the first direction being D2, and D1>D2;
depositing a conductive material along the first openings and forming the word lines extending along the first direction and continuously covering the plurality of channel areas arranged along the first direction.

10. The method for forming a three-dimensional memory according to claim 9, wherein the forming the word lines extending along the first direction and continuously covering the plurality of channel areas arranged along the first direction comprises:
depositing the conductive material along the plurality of first openings to form the plurality of word lines spaced apart away from each other along the direction perpendicular to the top surface of the substrate, the word lines comprising a first terminal face and a second terminal face opposite to the first terminal face along the first direction, the first terminal faces of the word lines spaced apart away from each other in the direction perpendicular to the top surface of the substrate being aligned, and the second terminal faces of the word lines being aligned.

11. The method for forming a three-dimensional memory according to claim 9, wherein the forming the plurality of lead lines located on the substrate comprises:
forming a dielectric layer covering surfaces the word lines and filling up gaps between adjacent word lines;
etching the dielectric layer and part of the word lines, and forming a plurality of lead trenches that expose the plurality of word lines respectively, there being at least two adjacent ones of the word lines in the direction perpendicular to the top surface of the substrate, the lead trench exposing one of the at least two adjacent word lines being located at the first end of the one of the at least two adjacent word lines, and the lead trench exposing the other one of the at least two adjacent word lines being located at the second end of the other one of the at least two adjacent word lines;
filling the conductive material in the lead trenches and forming the lead lines.

12. The method for forming a three-dimensional memory according to claim 11, wherein the forming the lead lines comprises:
forming an isolation layer covering a sidewall of the lead trench;
filling the conductive material in the lead trench to form the lead line covering an exposed surface of the word line and a surface of the isolation layer.

13. The method for forming a three-dimensional memory according to claim 11, wherein the word lines spaced apart away from each other in the direction perpendicular to the top surface of the substrate are sequentially numbered; and wherein the forming the plurality of lead trenches that expose the plurality of word lines respectively comprises:
etching the dielectric layer and part of the word lines to form the plurality of lead trenches, wherein the lead trenches exposing the word lines which are odd-numbered are located at the first ends of the word lines which are odd-numbered, and the lead trenches exposing the word lines which are even-numbered are located at the second ends of the word lines which are even-numbered.

14. The method for forming a three-dimensional memory according to claim 13, wherein the forming the plurality of lead trenches that expose the plurality of word lines respectively comprises:

etching the dielectric layer and part of the word lines to form the plurality of lead trenches, wherein depths of the lead trenches exposing the plurality of word lines which are odd-numbered gradually change along the first direction, and depths of the lead trenches exposing the plurality of word lines which are even-numbered gradually change along the first direction.

15. The method for forming a three-dimensional memory according to claim 14, wherein the depths of the plurality of lead trenches exposing the plurality of word lines which are odd-numbered respectively are gradually reduced in a direction parallel to a direction of the first ends pointing to the second ends of the word lines; and the depths of the plurality of lead trenches exposing the plurality of word lines which are even-numbered are gradually reduced in a direction parallel to a direction of the second ends pointing to the first ends of the word lines.

16. The method for forming a three-dimensional memory according to claim 13, wherein the forming the plurality of lead trenches that expose the plurality of word lines respectively comprises:

etching the dielectric layer and part of the word lines to form the plurality of lead trenches, wherein the plurality of lead trenches exposing the plurality of word lines which are odd-numbered respectively are equally spaced along the first direction, and the plurality of lead trenches exposing the plurality of word lines which are even-numbered respectively are equally spaced along the first direction.

17. The method for forming a three-dimensional memory according to claim 16, wherein, in the first direction, a distance between two lead lines connected to two adjacent ones of the word lines which are odd-numbered is equal to a distance between two lead lines connected to two adjacent ones of the word lines which are even-numbered.

18. The method for forming a three-dimensional memory according to claim 11, wherein the forming the plurality of lead trenches that expose the plurality of word lines respectively comprises:

etching the dielectric layer and part of the word lines to form the plurality of lead trenches, wherein a bottom of the lead trench only exposes the word line, or etching the dielectric layer and part of the word lines to form the plurality of lead trenches, wherein a bottom of the lead trench exposes part of the word line and part of the dielectric layer.

\* \* \* \* \*